US011569036B2

(12) United States Patent
Qi et al.

(10) Patent No.: US 11,569,036 B2
(45) Date of Patent: Jan. 31, 2023

(54) DIELECTRIC FILM AND POWER CAPACITOR COMPRISING DIELECTRIC FILM

(71) Applicant: Hitachi Energy Switzerland AG, Baden (CH)

(72) Inventors: Lejun Qi, Beijing (CN); Chau-Hon Ho, Loerrach (DE); Linnea Petersson, Västerås (SE); Jiansheng Chen, Beijing (CN)

(73) Assignee: HITACHI ENERGY SWITZERLAND AG, Baden (CH)

( * ) Notice: Subject to any disclaimer, the term of this patent is extended or adjusted under 35 U.S.C. 154(b) by 64 days.

(21) Appl. No.: 16/754,807

(22) PCT Filed: Oct. 9, 2017

(86) PCT No.: PCT/CN2017/105403
§ 371 (c)(1),
(2) Date: Apr. 9, 2020

(87) PCT Pub. No.: WO2019/071396
PCT Pub. Date: Apr. 18, 2019

(65) Prior Publication Data
US 2021/0193388 A1   Jun. 24, 2021

(51) Int. Cl.
*H01G 4/14* (2006.01)
*C08J 7/043* (2020.01)
*H01G 4/20* (2006.01)

(52) U.S. Cl.
CPC ............... *H01G 4/14* (2013.01); *C08J 7/043* (2020.01); *H01G 4/20* (2013.01); *C08J 2323/12* (2013.01)

(58) Field of Classification Search
CPC .. H01G 4/02; H01G 4/38; H01G 4/14; H01G 4/18; H01F 38/24
See application file for complete search history.

(56) References Cited

U.S. PATENT DOCUMENTS

| | | | |
|---|---|---|---|
| 5,077,135 A | 12/1991 | Wyman | |
| 5,475,272 A | 12/1995 | Gothelf | |
| 5,636,100 A * | 6/1997 | Zheng | H01G 4/20 428/209 |
| 6,426,861 B1 * | 7/2002 | Munshi | C08J 5/18 361/312 |
| 6,594,134 B2 * | 7/2003 | Yializis | B05D 1/60 361/303 |
| 6,864,147 B1 | 3/2005 | Fife et al. | |
| 7,852,611 B2 | 12/2010 | Tan | |
| 2005/0130368 A1 | 6/2005 | Ooi et al. | |
| 2011/0110015 A1 * | 5/2011 | Zhang | H01G 4/20 361/311 |
| 2015/0235769 A1 * | 8/2015 | Carver | H01G 4/20 361/303 |
| 2017/0282474 A1 * | 10/2017 | Baer | B32B 7/02 |

FOREIGN PATENT DOCUMENTS

| | | |
|---|---|---|
| CN | 1059534 A | 3/1992 |
| CN | 101863120 A | 10/2010 |
| CN | 102737843 A | 1/2012 |
| CN | 103404249 A | 11/2013 |
| CN | 103987766 A | 8/2014 |
| CN | 104053689 A | 9/2014 |
| CN | 104479161 A | 4/2015 |
| CN | 104903982 A | 9/2015 |
| EP | 0392115 A3 | 3/1992 |
| EP | 2511921 A1 | 10/2012 |
| JP | H06-196357 A | 7/1994 |
| JP | 2667921 B2 | 10/1997 |
| JP | 11307244 A | 11/1999 |
| JP | 2000021681 A | 1/2000 |
| JP | 2000-216043 A | 8/2000 |
| JP | 2007-142396 A | 6/2007 |
| JP | 2018-163950 A | 10/2018 |
| WO | WO 2012/016964 A1 | 2/2012 |
| WO | WO 2013/082409 A1 | 6/2013 |
| WO | WO 2013/085467 A1 | 6/2013 |
| WO | WO 2014/074122 | 5/2014 |
| WO | WO 2014/081917 A2 | 5/2014 |
| WO | WO 2016/100260 A2 | 6/2016 |

OTHER PUBLICATIONS

JP Notice of Reasons for Refusal, Japanese Patent Application No. 2020-520102, dated May 17, 2021, 8 pages.
Jones, R., Shaw, D., Roehrig, M., & Legonidec, P. (1997). An improved metallized film capacitor using a new acrylate coating process. Journal of Plastic Film and Sheeting, 13(2), 150-158.
Yi, E., Furgal, J. C., Azurdia, J., Laine, R. M., (2014). Roll your own—nano-nanocomposite capacitors. Journal of Materials Chemistry, 2(11), 3766-3775.
W. Decker, A. Yializis, "Surface functionalization of polymer films and Webs Using Subatmospheric Plasmas," Society of Vacuum Coaters, 1998 Annual Technical Conference Proceedings, pp. 355-357.
Fortin, J. B., et al., "Chemical Vapor Deposition Polymerization: The Growth and Properties of Parylene Thin Films," Mar. 9, 2013, Springer US., 112 pages.
B.V. Ceres, J.M. Schultz, "Dependence of Electrical Breakdown on Spherulite Size in Isotactic Polypropylene," Journal of Applied Polymer Science, No. 29, Dec. 1984, pp. 4183-4197.
Kim et al., "Morphological Characteristics and Electrical Conduction in Syndiotactic Polypropylene, "Journal of Physics D: Applied Physics, vol. 33, No. 4, pp. 464-471.

(Continued)

*Primary Examiner* — Eric W Thomas
(74) *Attorney, Agent, or Firm* — Sage Patent Group

(57) ABSTRACT

A dielectric film is provided. The dielectric film includes a dielectric polymer substrate having two surfaces opposite to each other and a coating layer formed on at least one of the two surfaces of the dielectric polymer substrate by chemical vapor deposition polymerization and/or irradiation polymerization. A power capacitor includes the dielectric film. A process for preparing the dielectric film is provided.

15 Claims, No Drawings

(56) References Cited

OTHER PUBLICATIONS

Khazaka, R., et al., "Parameters Affecting the DC Breakdown Strength of Parylene F Thin Films," IEEE 2011 Annual Report Conference on Electrical Insulation and Dielectric Phenomena, Oct. 16-19, 2011, pp. 740-743.
International Search Report and Written Opinion of the International Searching Authority, PCT/CN2017/105403, dated Jun. 27, 2018, 8 pages.
Examination Report, Chinese Patent Application No. 2017800958671, dated Jul. 1, 2022, 12 pages.
Manjun, H., et al., Polymer Physics, Chapter 9 Other Properties of Polymers, pp. 273-275, Fudan University Press, Mar. 2007, 13 pages.
Examination Report, Chinese Patent Application No. 2017800958671, dated Jan. 19, 2022, 4 pages.

* cited by examiner

DIELECTRIC FILM AND POWER CAPACITOR COMPRISING DIELECTRIC FILM

CROSS REFERENCE TO RELATED APPLICATIONS

This application is a 35 U.S.C. § 371 national stage application of PCT International Application No. PCT/CN2017/105403 filed on Oct. 9, 2017, the disclosure and content of which is incorporated by reference herein in its entirety.

FIELD OF THE INVENTION

The present invention relates to a dielectric film comprising a dielectric polymer substrate and a coating layer. The present invention also relates to a power capacitor comprising the dielectric film. The present invention further relates to a process for preparing the dielectric film.

BACKGROUND OF THE INVENTION

Polymeric dielectric materials are widely used in power products. The polymeric dielectric materials in the form of films are inexpensive, possess high dielectric breakdown strength, high energy density and low dielectric loss as compared to ceramic dielectrics and electrolytes. Commonly used polymeric dielectric films include PP (polypropylene), PET (polyethylene terephtalate), PC (polycarbonate) and the like. Biaxially oriented polypropylene (BOPP) is attractive for energy storage applications such as capacitors due to its high dielectric breakdown strength and low dielectric loss.

For a dielectric material, the dielectric breakdown strength is one of the major concerns that shall be addressed to meet different requirements in the power industries. The electrical property, especially the dielectric strength of the dielectric material determines the reliability of electrical devices.

In practice, to increase the operation electric stress of dielectric films, thin coating layers are generally applied on the film surfaces. However, the coating materials and interface treatment often adversely impact the dielectric performance of the dielectric films.

Many investigations have been conducted to improve the dielectric performance of the dielectric film per se so as to resist the adverse impact due to the application of the coating layers. For example, it has been investigated that the dielectric breakdown properties of polypropylene are influenced by the morphology and crystal structure of the polymer. Schultz et. al. (J. App. Poly. Sci. 29 (1984), pages 4183-4197) and Yoshino et. al. (J. Phys. D: Appl. Phys. 33 (2000), pages 464-472) demonstrated that the dielectric breakdown strength of polypropylene decreased with the increase of the average spherulite (spherical crystallite) size. On the other hand, WO 2012/016964 disclosed a polypropylene composition comprising alpha-nucleating agents, which demonstrated an improved alterative current (AC) breakdown strength.

Thus, there is a continued desire to develop a coated dielectric film with improved dielectric performance. It would be even more desired to provide a coated dielectric film with improved dielectric performance in an easier or more efficient way as compared with the prior art.

SUMMARY OF THE INVENTION

In a first aspect, the present invention relates to a dielectric film comprising: a dielectric polymer substrate having two surfaces opposite to each other, and a coating layer formed on at least one of the two surfaces of the dielectric polymer substrate by chemical vapor deposition polymerization and/or irradiation polymerization, wherein the dielectric polymer substrate has a first thickness between the two surfaces and the coating layer has a second thickness less than about 50% of the first thickness of the dielectric polymer substrate.

In a second aspect, the present invention relates to a power capacitor comprising a dielectric film, wherein the dielectric film comprises a dielectric polymer substrate having two surfaces opposite to each other, and a coating layer formed on at least one of the two surfaces of the dielectric polymer substrate by chemical vapor deposition polymerization and/or irradiation polymerization, and wherein the dielectric polymer substrate has a first thickness between the two surfaces and the coating layer has a second thickness less than about 50% of the first thickness of the dielectric polymer substrate.

In a third aspect, the present invention relates to a process for preparing a dielectric film, comprising the steps of:
providing a dielectric polymer substrate having two surfaces opposite to each other and a first thickness constituted between the two surfaces, and
forming a coating layer on at least one of the two surfaces of the dielectric polymer substrate by chemical vapor deposition polymerization and/or irradiation polymerization, wherein the coating layer has a second thickness which is less than about 50% of the first thickness of the dielectric polymer substrate.

By forming a coating layer on the surfaces of the polymer dielectric substrate by chemical vapor deposition polymerization and/or irradiation polymerization, the inventors have surprisingly found that a synergistic effect on dielectric breakdown strength can be obtained as compared with the polymer dielectric substrate alone and the coating layer alone. In other words, the dielectric film according to the present invention exhibits higher dielectric breakdown strength than each of its elements, i.e., the polymer dielectric substrate and the coating layer, and therefore solves the technical problem of prior art coating materials adversely impacting the dielectric performance of the dielectric films. Thus, it is possible to provide a coated dielectric film with improved dielectric performance in an easier or more efficient way as compared with the prior art, which is of great commercial significance.

DETAILED DESCRIPTION OF THE INVENTION

Although the present invention will be described with respect to particular embodiments, this description is not to be construed in a limiting sense.

As used in this specification and in the appended claims, the singular forms of "a" and "an" also include the respective plurals unless the context clearly dictates otherwise.

In the context of the present invention, the terms "about" and "approximately" denote an interval of accuracy that a person skilled in the art will understand to still ensure the technical effect of the feature in question. The term typically indicates a deviation from the indicated numerical value of ±20%, preferably ±15%, more preferably ±10%, and even more preferably ±5% or even±1%. It is to be understood that the term "comprising" is not limiting. For the purposes of the present invention the term "consisting of" is considered to be an embodiment of the term "comprising". If hereinafter a group is defined to comprise at least a certain number of embodiments.

Furthermore, the terms "first", "second", "third" or "a)", "b)", "c)", "d)" etc. and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In case the terms "first", "second", "third" or "a)", "b)", "c)", "d)" etc. relate to steps of a method or use, there is no time or time interval coherence between the steps, i.e. the steps may be carried out simultaneously or there may be time intervals of seconds, minutes, hours, days, weeks, months or even years between such steps, unless otherwise indicated in the application as set forth herein above or below.

Dielectric Film

It is an object of the present invention to provide a dielectric film comprising a dielectric polymer substrate having two surfaces opposite to each other, and a coating layer formed on at least one of the two surfaces of the dielectric polymer substrate by chemical vapor deposition polymerization and/or irradiation polymerization.

As used herein, the term "chemical vapor deposition polymerization" refers to a process of polymerization by chemical vapor deposition (CVD). In typical CVD, the substrate is exposed to one or more volatile precursors, which react and/or decompose on the substrate surface to produce the desired deposit. For example, the basic process may comprise feeding a precursor gas into vacuum plasma which has energetic particles and make the precursor gas fragmented, so that some of the fragmented molecules hit and condense on the substrate surface. As required, a chemical initiator can be additionally used during the chemical vapor deposition polymerization.

As used herein, the terms "irradiation polymerization" or "radiation polymerization" are exchangeable with each other and refer to a process of polymerization initiated by exposure to radiation. In the present invention, radiation can be the emission or transmission of energy in the form of waves or particles through space or through a material medium, which includes, but is not limited to, electromagnetic radiation, such as radio waves, microwaves, visible light, infrared light, ultraviolet light, x-rays, and gamma radiation (γ); particle radiation, such as electron beam, alpha radiation (α), beta radiation (β), and neutron radiation (particles of non-zero rest energy); acoustic radiation, such as ultrasound, sound, and seismic waves (dependent on a physical transmission medium); gravitational radiation, radiation that takes the form of gravitational waves, or ripples in the curvature of spacetime; and so on. As required, a chemical initiator can be additionally used during the irradiation/radiation polymerization.

As used herein, the term "initiator" refers to a substance or molecule (other than reactant) that can produce radical species to initiate a chain reaction.

Without being bound to any theory, it is believed that the specific process for forming the coating layer at least partially contributes to the improved dielectric property of the dielectric film of the present invention. The chemical vapor deposition polymerization and irradiation polymerization generally starts from small molecules or monomers which are believed to be more free to access the microdefects of a substrate so as to be more conformal and curative to the surface of the substrate than macromolecules. The simultaneous polymerization and formation of the coating layer may promote the significant synergistic effect between the dielectric polymer substrate and the coating layer, and thereby provide a dielectric film with improved dielectric breakdown strength as compared with the polymer dielectric substrate alone and the coating layer alone.

According to the present invention, the dielectric polymer substrate may have a first thickness between the two surfaces and the coating layer has a second thickness less than about 50% of the first thickness of the dielectric polymer substrate. The inventors have further surprisingly found that the synergistic effect of the breakdown strength may be impacted by the thickness of the coating layer, the substrate and/or the dielectric film.

In an embodiment of the present invention, the second thickness of the coating layer is less than about 30%, preferably less than about 25%, more preferably less than about 20%, most preferably less than about 15% of the first thickness of the dielectric polymer substrate.

In another embodiment of the present invention, the second thickness of the coating layer is more than 0%, such as more than about 0.5%, preferably more than about 1%, more preferably more than about 5%, most preferably more than about 10% of the first thickness of the dielectric polymer substrate.

The thickness of the dielectric film, the dielectric polymer substrate, and the coating layer can be determined by those skilled in the art according to the practical requirements. For example, the dielectric film may have a total thickness of from about 1 µm to about 500 µm.

In an embodiment of the present invention, the dielectric film has a total thickness of about 2 µm to about 200 µm, or about 5 µm to about 100 µm, or about 6 µm to about 50 µm, or about 8 µm to about 30 µm, or about 10 µm to about 20 µm.

In an embodiment of the present invention, the first thickness of the dielectric polymer substrate may be in the range of about 1 µm to about 100 µm, or about 2 µm to about 50 µm, or about 4 µm to about 30 µm, or about 6 µm to about 20 µm, or about 8 µm to about 15 µm.

In an embodiment of the present invention, the second thickness of the coating layer may be in the range of about 0.01 µm to about 50 µm, or about 0.1 µm to about 25 µm, or about 0.5 µm to about 10 µm, or about 0.8 µm to about 5 µm, or about 1 µm to about 3 µm, or about 1.2 µm to about 2.5 µm, or about 1.4 µm to about 2.0 µm.

In an embodiment of the present invention, the coating layer may comprise any one selected from parylenes, polyvinylidenes, polynitriles, poly(meth)acrylates, polyvinyl ethers, and copolymers or mixtures thereof.

In a further embodiment, the parylene is any one selected from Parylene F, Parylene N, Parylene C, Parylene D, Parylene HT, reactive parylenes, and copolymers or mixtures thereof. The parylene, also called as polyparaxylylene, is derived from a trade name for a variety of chemical vapor deposited poly(p-xylylene) polymers which can be used as moisture and dielectric barriers. Among others, Parylene C is the most popular due to its combination of barrier properties, cost, and other processing advantages. Generally, parylene is self-initiated (no initiator needed) and un-terminated (no termination group needed) with no solvent or catalyst required. The commonly used precursor, [2.2]paracyclophane, yields 100% monomer above 550° C. in vacuum and does not yield any by-products (Gorham Process). In an embodiment, the coating layer comprises a parylene. In a further embodiment, the coating layer comprises at least one selected from Parylene F, Parylene N, and Parylene C. In an even further embodiment, the coating layer comprises Parylene F.

In a further embodiment, the polyvinylidene is any one selected from polyvinylidene fluoride, polyvinylidene chloride, polyvinylidene cyanide, and copolymers or mixtures thereof.

In a further embodiment, the polynitrile is any one selected from acrylonitrile homopolymers and copolymers.

In a further embodiment, the poly(meth)acrylate is any one selected from poly(isobutyl methacrylate), poly(propyl methacrylate), poly(ethyl methacrylate), poly(methyl methacrylate), poly(butyl acrylate), poly(methyl acrylate), and copolymers or mixtures thereof. The term "(meth)acrylate" as used herein denotes acrylate or methacrylate.

In a further embodiment, the polyvinyl ether is derived from any one monomer selected from 1,4-butanediol vinyl ether, butyl vinyl ether, ethyleneglycol vinyl ether, ethyl vinyl ether, or any derivatives thereof containing alkyl, aryl, arylalkyl, alicyclic, heteroaryl, heterocyclic or any other group that can easily be further functionalised by reactions commonly used in organic synthesis and where these groups are, optionally, conveniently protected for the purpose of the polymerisation reaction.

In an embodiment of the present invention, the coating layer may comprise a crosslinking polymer. The crosslinking polymer may be a homopolymer or a copolymer. In an embodiment, the coating layer comprises a crosslinking copolymer.

In a specific embodiment, the coating layer comprises a crosslinking copolymer derived from a mixture of (meth)acrylate(s), vinyl ether(s), and initiator(s).

Suitable (meth)acrylate(s) used herein may include, but are not limited to, methyl (meth)acrylate, ethyl (meth)acrylate, isooctyl (meth)acrylate, 4-methyl-2-pentyl (meth)acrylate, 2-methylbutyl (meth) acrylate, isoamyl (meth)acrylate, sec-butyl (meth)acrylate, n-butyl (meth)acrylate, 2-ethylhexyl (meth)acrylate, 2-octyl (meth)acrylate, lauryl (meth)acrylate, isodecyl (meth)acrylate, isobornyl (meth) acrylate, cyclohexyl (meth)acrylate, glycidyl (meth)acrylate, hydroxyalkyl (meth)acrylate, tricyclodecanedimethylol di(meth)acrylate, acetoacetoxyethyl (meth)acrylate and/or mixtures thereof.

Suitable vinyl ether(s) used herein may include, but are not limited to, vinyl alkyl ethers, vinyl aryl ethers, divinyl alkyl ethers, divinyl aryl ethers, aralkyl divinyl ethers, and mixtures thereof. Examples of suitable vinyl alkyl ethers are methyl vinyl ether, ethyl vinyl ether, hexyl vinyl ether, octyl vinyl ether, decyl vinyl ether, ethylhexyl vinyl ether, methoxyethyl vinyl ether, ethoxyethyl vinyl ether, chloroethyl vinyl ether, 1-methyl-2,2-dimethylpropyl vinyl ether, 2-ethylbutyl vinyl ether, hydroxyethyl vinyl ether, dimethylaminoethyl vinyl ether, diethylaminoethyl vinyl ether, butylaminoethyl vinyl ether, hydroxybutyl vinyl ether (HBVE), benzyl vinyl ether, tetrahydrofurfuryl vinyl ether, and mixtures thereof. Examples of suitable vinyl aryl ethers are vinyl phenyl ether, vinyl tolyl ether, vinyl chlorophenyl ether, vinyl-2,4-dichlorophenyl ether, vinyl naphthyl ether, vinyl anthranyl ether, and mixtures thereof. Examples of suitable divinyl alkyl ethers are 1,4-butanediol divinyl ether, 1,6-hexanediol divinyl ether, 1,8-octanediol divinyl ether, divinylether of triethylene glycol (such as (Rapicure DVE-3)), and mixtures thereof. Examples of suitable divinyl aryl ethers are a divinyl ether derivative of bis-phenol A (DVE-BPA), hydroquinone divinyl ether, resorcinol divinyl ether and mixtures thereof. Examples of suitable aralkyl divinyl ethers are 1,4-benzene dimethanol divinyl ether, N-m-chlorophenyl diethanolamine divinyl ether, m-phenylene bis (ethylene glycol) divinyl ether and mixtures thereof.

All the (meth)acrylate(s) and/or vinyl ether(s) may be used alone or in any combination.

The initiators used herein may include any known polymerization initiators without any special limitations. Specifically, suitable initiators used herein may include, for example, a peroxides such as benzoyl peroxide, di-t-butyl hydroperoxide, t-butyl hydroperoxide, cumyl peroxide, cumene hydroperoxide, diisopropyl benzene hydroperoxide, t-butyl peroxybenzoate, lauryl peroxide, acetyl peroxide, t-butyl peroxy-2-ethylhexanoate, tert-amylperoxy-2-ethylhexanoate, 1,1,3,3-tetramethylbutyl-peroxy-ethylhexanoate and the like; azo compounds such as 2,2'-azobisisobutylonitrile, 2,2'-azobis-2-methylbutylonitrile, azobisdimethylvaleronitrile, azobiscyclohexane carbonitrile and the like; a UV polymerization initiator such as benzyldimethy ketal or benzoinisopropyl ether and the like; an acyl phosphine oxide-based photopolymerization initiator such as 2,4,6-trimethylbenzoyldiphenyl phosphine oxide, 2,6-dimethoxybenzoyldiphenyl phosphine oxide, 2,3,5,6-tetramethylbenzoyldiphenyl phosphine oxide, benzoylbis(2,6-dimethylphenyl) phosphonate and 2,4,6-trimethylbenzoylethoxyphenyl phosphine oxide, and the like. The initiators may be used alone or in combination.

In an embodiment of the present invention, the irradiation polymerization is conducted by any one selected from UV irradiation, electron beam irradiation, gamma irradiation, X-ray irradiation, microwave irradiation and combinations thereof. In an embodiment, the irradiation polymerization is conducted by UV irradiation.

In an embodiment of the present invention, the dielectric polymer substrate comprises any one selected from polypropylene (PP) such as a bi-axial oriented polypropylene (BOPP), crosslinked polyethylene (PPX), polyethylene (PE), crosslinked polyethylene (PEX), polyethylene terephthalate (PET), polycarbonate (PC), polyethylene naphthalate (PEN), polyphenylene sulfide (PPS), polytetrafluoroethylene (PTFE), polyvinylidene difluoride (PVDF), polyamide (PA), polyimide (PI), polyetherimide (PEI), polyvinyl chloride (PVC), polystyrene (PS), cyanoresins, and copolymers or mixtures thereof.

In an embodiment, the dielectric polymer substrate comprises any one selected from polypropylene (PP), polyethylene terephthalate (PET), polycarbonate (PC), and copolymers or mixtures thereof.

In an embodiment, the dielectric polymer substrate comprises polypropylene (PP), especially a bi-axial oriented polypropylene (BOPP).

In an embodiment of the present invention, the dielectric film may further comprise a primer layer between the dielectric polymer substrate and the coating layer. The primer layer may comprise an adhesion promoter to enhance the adhesion between the dielectric polymer substrate and the coating layer or ensure a stable adhesion between the dielectric polymer substrate and the coating layer.

In a specific embodiment of the present invention, the adhesion promoter may be a silane. Suitable silanes used herein include, but are not limited to, vinyltrimethoxysilane, vinyltriethoxysilane, vinyltris(methoxyethoxy)silane, 3-aminopropyltrimethoxysilane, 3-aminopropyltriethoxysilane, N-(2-aminoethyl)-3-aminopropyltrimethoxysilane, N-(2-aminoethyl)-3-aminopropylmethyldimethoxysilane, N,N-dimethyl-3-aminopropyltrimethoxysilane, N-phenyl-3aminopropyltrimethoxysilane, 3-chloropropyltrimethoxysilane, 3-chloropropylmethyldimethoxysilane, 3chloropropylmethyldiethoxysilane, 3-methacryloxypropyltrimethoxysilane, 3-methacryloxypropylmethyldimethoxysilane, 3-glycidoxypropyltrimethoxysilane, 3-glycidoxypropylmethyldimethoxysilane, 3-(1,2-oxycyclohexyl)propyltrimethoxysilane, 3-(1,2-oxycyclohexyl)propylmethyldimethoxysilane, 3-mercaptopropyltrimethoxysilane, 3-mercaptopropylmethyldimethoxysilane and 3-ureidopropyltrimethoxysilane.

Power Capacitor

It is another object of the present invention to provide a power capacitor.

In an embodiment of the present invention, the power capacitor comprises a dielectric film, wherein the dielectric film comprises a dielectric polymer substrate having two surfaces opposite to each other, and a coating layer formed on at least one of the two surfaces of the dielectric polymer substrate by chemical vapor deposition polymerization and/or irradiation polymerization.

In an embodiment of the present invention, the power capacitor comprises a dielectric film, wherein the dielectric film comprises a dielectric polymer substrate having two surfaces opposite to each other, and a coating layer formed on at least one of the two surfaces of the dielectric polymer substrate by chemical vapor deposition polymerization and/or irradiation polymerization, and wherein the dielectric polymer substrate has a first thickness between the two surfaces and the coating layer has a second thickness less than about 50% of the first thickness of the dielectric polymer substrate.

The power capacitor according to the invention can be at least one selected from dry-type capacitors, impregnated capacitors, and other potentially impregnated insulation systems with film/oils.

In an embodiment of the present invention, the power capacitor may be used for a rated voltage that is at least about 1 kV, preferably at least about 5 kV, more preferably at least about 10 kV.

The power capacitor according to the invention may be a prior art power capacitor modified by the dielectric film according to the present invention. For example, the power capacitor according to the invention may be obtained by replacing one or more of the dielectric films in a prior art power capacitor with a dielectric film according to the present invention. Examples of a prior art power capacitor are described in, for example, U.S. Pat. No. 5,475,272, which describes a high-voltage capacitor built up of a plurality of capacitor elements stacked on top of each other and placed in a common container.

Process for Preparing a Dielectric Film

According to the present invention, a process for preparing a dielectric film is provided.

In an embodiment of the present invention, the process for preparing a dielectric film comprises the steps of:
  providing a dielectric polymer substrate having two surfaces opposite to each other and a first thickness constituted between the two surfaces, and
  forming a coating layer on at least one of the two surfaces of the dielectric polymer substrate by chemical vapor deposition polymerization and/or irradiation polymerization.

In an embodiment of the present invention, the process for preparing a dielectric film comprises the steps of:
  providing a dielectric polymer substrate having two surfaces opposite to each other and a first thickness constituted between the two surfaces, and
  forming a coating layer on at least one of the two surfaces of the dielectric polymer substrate by chemical vapor deposition polymerization and/or irradiation polymerization, wherein the coating layer has a second thickness which is less than about 50% of the first thickness of the dielectric polymer substrate.

According to the present invention, the process conditions for forming the coating layer can be determined by those skilled in the art as required (see, for example, Chemical Vapor Deposition Polymerization: The Growth and Properties of Parylene Thin Films, by Jeffrey B. Fortin and Toh-Ming Lu). In an embodiment of the present invention, during the chemical vapor deposition (CVD) polymerization, the temperature of the substrate may be controlled to a relatively low temperature, such as below about 150° C., preferably below about 100° C., more preferably below about 80° C., most preferably below about 45° C. The relatively low substrate temperature allows coating of temperature-sensitive substrates (e.g., poly(lactic acid)) without decomposition.

In some embodiments of the present invention, CVD polymerization may undergo pyrolysis of the starting materials and free radical polymerization to produce a coating layer. The pyrolysis temperature can be determined by those skilled in the art as required. For example, pyrolysis is preferably conducted at a temperature of above about 350° C., preferably above about 450° C., more preferably above about 550° C., most preferably above about 650° C. In an embodiment of the present invention, pyrolysis is conducted at a temperature of below about 1500° C., preferably below about 1200° C., more preferably below about 900° C., most preferably below about 800° C.

In an embodiment of the present invention, a coating layer with compositional gradients may be formed by chemical vapor deposition polymerization.

According to the present invention, a radiation sensitive coating layer can be formed by irradiation polymerization. In an embodiment of the present invention, a radiation sensitive composition for forming the coating layer may comprise an alkali-soluble resin, a cross-linking agent, and a radiation polymerization initiator. In an embodiment of the present invention, the radiation sensitive composition for forming the coating layer may comprise an alkali-soluble resin comprising either one or both of a polyvinyl phenol and a phenol resin (other than a polyvinyl phenol) having a weight average molecular weight of about 2,000 or higher, an acrylate resin having two or more active methylol groups in the molecule, and a ketal initiator. The process conditions can be determined by those skilled in the art based on the property of the radiation sensitive composition.

In an embodiment of the present invention, the coating layer is formed on only one surface of the dielectric polymer substrate.

In an embodiment of the present invention, the coating layer is formed on both of two surfaces of the dielectric polymer substrate. The coating layers on the two surfaces of the dielectric polymer substrate, respectively, may be same or different in constitution, and may be formed either simultaneously or sequentially.

In some embodiments, a first coating layer and a second coating layer are formed independently by chemical vapor deposition polymerization and/or irradiation polymerization on the two surfaces of the substrate, respectively.

In some embodiments, a first coating layer and a second coating layer are both formed by chemical vapor deposition polymerization on the two surfaces of the substrate, respectively.

In some embodiments, a first coating layer and a second coating layer are both formed independently by irradiation polymerization on the two surfaces of the substrate, respectively.

In some embodiments, a first coating layer is formed by chemical vapor deposition polymerization on one of the two surfaces of the substrate, and a second coating layer is formed by and/or irradiation polymerization on the other surface of the substrate.

In some embodiments, a first coating layer is formed by chemical vapor deposition polymerization and/or irradiation polymerization on one of the two surfaces of the substrate, and a second coating layer is formed on the other surface of the substrate by a technique commonly known in the art, for example, chemical deposition by spraying, dipping, sputtering, and the like.

Prior to the formation of the coating layer, optional pretreatment of the substrate may be applied to improve the adhesion behavior. In an embodiment of the present invention, the process for preparing a dielectric film further comprises the step of forming a primer layer on the at least one of the two surfaces of the dielectric polymer substrate, for example, on one or both of the two surfaces of the dielectric polymer substrate, before the step of forming the coating layer. In another embodiment of the present invention, a pretreatment with cold gas plasmas, such as oxygen, hydrogen, nitrogen, ammoniac, carbon dioxide, ethylene, acetylene, propylenes, butylenes, ethanol, acetone, sulfur dioxide or mixtures thereof is conducted on the at least one of the two surfaces of the dielectric polymer substrate, for example, on one or both of the two surfaces of the dielectric polymer substrate, before the step of forming the coating layer.

EXAMPLES

The present invention will be further clarified by the following examples, which are intended to be purely exemplary of the invention. Other embodiments of the invention will be apparent to those skilled in the art from a consideration of this specification or practice of the invention as disclosed herein.

Materials

The following materials were used in the examples.

TABLE 1

| Material | | Model | Supplier |
| --- | --- | --- | --- |
| substrate | BOPP film | EC | Tervakoski |
|  | PET film | Mylar | Dupont Teijin |
| Coating materials | Parylene N powders | Parylene N | Darynanotech |
|  | Toluene | 10022818 | Sinopharm |
|  | Acrylic coating resins | Konform AR | Chemtronics |
| Adhesion promoter | 3-Methacryloxypropyl-trimethoxysilane | A-174 Silane | Specialty Coating Systems |

Sample Preparation

Example 1

A micro fiber cleaning cloth wiper was wetted with A-174 Silane, and then used the wetted wiper to wipe the surface of the BOPP film. The treated BOPP film was then quickly transferred to a closed chamber and stored for 40 minutes. An ultrathin layer of adhesion promoter (around 0.02-0.05 μm) was formed on the surface of the BOPP film.

A CVD polymerization process was conducted with a XY-type CVD system (Darynanotech) to form a parylene coating layer on the top of the adhesion promoter layer. The specific process is as the following: the solid parylene dimers of parylene N was firstly vaporized at 150° C. and then pyrolyzed at 680° C. to yield stable monomeric diradical paraxylylene which was in turn deposited and polymerized atop of the adhesion promoter layer of the BOPP film in the vacuum chamber (0.1 Torr) at room temperature.

Five samples with different substrate thickness and coating thickness were prepared and numbered as Samples A, B, C, D and E, respectively.

Example 2

A micro fiber cleaning cloth wiper was wetted with A-174 Silane, and then used the wetted wiper to wipe the surface of the PET film. The treated PET film was then quickly transferred to a closed chamber and stored for 40 minutes. An ultrathin layer of adhesion promoter (around 0.02-0.05 μm) was formed on the surface of the PET film.

A CVD polymerization process was conducted with a XY-type CVD system (Darynanotech) to form a parylene coating layer on the top of the adhesion promoter layer. The specific process is as the following: the solid parylene dimers of parylene N was firstly vaporized at 150° C. and then pyrolyzed at 680° C. to yield stable monomeric diradical paraxylylene which was in turn deposited and polymerized atop of the adhesion promoter layer of the BOPP film in the vacuum chamber (0.1 Torr) at room temperature.

One sample was prepared and numbered as Sample F.

Example 3

A micro fiber cleaning cloth wiper was wetted with A-174 Silane, and then used the wetted wiper to wipe the surface of the BOPP film. The treated BOPP film was then quickly transferred to a closed chamber and stored for 40 minutes. An ultrathin layer of adhesion promoter (around 0.02-0.05 μm) was formed on the surface of the BOPP film.

An irradiation polymerization process was conducted with a coating composition comprising (a) 65 wt. % tricyclodecanedimethylol di(meth)acrylate, (b) 32 wt. % of a vinyl ether compound, i.e., a mixture of hydroxybutyl vinyl ether (HBVE), divinylether of triethylene glycol (Rapicure DVE-3) and a divinyl ether derivative of bis-phenol A (DVE-BPA), and (c) 3 wt. % benzyldimethy ketal. The specific process is as the following: the components (a), (b) and (c) were mixed, de-bubbled, and applied onto the adhesion promoter layer at room temperature under $N_2$ atmosphere, and the coated films were then exposed to the UV radiation of a medium pressure mercury lamp for 5 seconds.

Two samples with different substrate thickness and coating thickness were prepared and numbered as Samples G and H, respectively.

Comparative Example 1

A micro fiber cleaning cloth wiper was wetted with A-174 Silane, and then used the wetted wiper to wipe the surface of the BOPP film. The treated BOPP film was then quickly transferred to a closed chamber and stored for 40 minutes. An ultrathin layer of adhesion promoter (around 0.02-0.05 μm) was formed on the surface of the BOPP film.

A cast coating process was conducted to form a parylene coating layer on the top of the adhesion promoter layer. The specific process is as the following: Parylene N powders were dissolved in toluene at a concentration of 10 wt. % at 50° C., the parylene solution was cast onto the adhesion promoter layer of the BOPP film, and then the coated film was quickly transferred to a vacuum chamber, dried and naturally cooled down to room temperature.

Two samples with different substrate thickness and coating thickness were prepared and numbered as Comparative Samples A and B (shorted as Samples CA and CB), respectively.

Test

The processability and properties of the dielectric film samples were evaluated in terms of processability and electrical properties.

1. Processability

All of the above dielectric film samples were prepared with good appearance, which indicates good processability of the present invention.

2. Dielectric Properties

Dielectric breakdown tests were performed on film samples in the air at 25° C. with a voltage ramp of 500 V/s. At the same time, the bottom (GND) electrode was composed of a steel plate; the top electrode was made of aluminum (Al) foil (electrode area: about 2.5 cm$^2$). The peak voltage was recorded during the breakdown event. The dielectric breakdown strength was then obtained to divide the peak voltage by the sample thickness. For each sample, 20 data points were used to obtain the final average dielectric strength.

Table 2 shows the test results of the above film samples as well as the pure BOPP and PET films.

TABLE 2

Dielectric Strength Test Results

| Sample Name | Substrate Thickness (μm) | Coating Thickness (μm) | The ratio of the coating thickness to the substrate thickness | Average BD strength (V/μm) |
|---|---|---|---|---|
| BOPP | 9 | 0.0 | 0 | 684.3 ± 95.1 |
| PET | 10 | 0.0 | 0 | 592.3 ± 105.5 |
| A | 9 | 0.1 | 1.1% | 709.6 ± 85.2 |
| B | 9 | 0.3 | 3.3% | 717.9 ± 79.1 |
| C | 10 | 0.9 | 9.0% | 735.8 ± 80.6 |
| D | 10 | 1.4 | 14.0% | 765.4 ± 89.5 |
| E | 12 | 2.9 | 24.2% | 685.2 ± 92.7 |
| F | 9 | 1.3 | 14.4% | 611.6 ± 98.5 |
| G | 10 | 1.3 | 13.0% | 705.8 ± 70.3 |
| H | 10 | 2.4 | 24.0% | 686.5 ± 101.2 |
| CA | 9 | 0.3 | 3.3% | 643.9 ± 88.5 |
| CB | 10 | 1.4 | 14.0% | 621.3 ± 83.9 |

It can be seen from Table 2 that all of the dielectric film samples according to the present invention exhibit higher or comparable dielectric breakdown strength as compared with the substrate film (i.e., BOPP film or PET film) alone.

It is generally believed that, when a substrate is coated with a coating layer, the dielectric breakdown strength of the resulting film would be impaired especially in the case that the dielectric breakdown strength of the coating layer is lower than that of the substrate. This is demonstrated by, for example, Samples CA and CB as shown in Table 2.

However, in the present invention, regardless of the lower dielectric breakdown strength of the coating layer (for example, Parylene N has a dielectric breakdown strength of 276V/μm), the combination of the dielectric substrate with a coating layer formed by CVD polymerization and/or irradiation polymerization provides a dielectric film with an even higher dielectric breakdown strength than the dielectric substrate alone (see Samples A to H as compared with BOPP or PET in Table 2). In other words, the present invention makes it possible to obtain a dielectric film with an improved dielectric property in the case that a coating layer is applied. Without being bound to any theory, it is believed that the improved dielectric property is at least partly due to the surprising synergistic effect between the substrate and the coating layer formed by CVD polymerization and/or irradiation polymerization.

It should be noted that the above-mentioned embodiments illustrate rather than limit the invention, and that those skilled in the art will be able to design many alternative embodiments without departing from the scope of the appended claims. Although claims have been formulated in this application to particular combinations of features, it should be understood that the scope of the present disclosure also includes any novel features or any novel combinations of features disclosed herein either explicitly or implicitly or any generalization thereof, whether or not it relates to the same invention as presently claimed in any claim. The applicants hereby give notice that new claims may be formulated to such features and/or combinations of features during the prosecution of the present application or of any further application derived therefrom.

What is claimed is:

1. A dielectric film comprising:
    a dielectric polymer substrate having two surfaces opposite to each other; and
    a coating layer formed on at least one of the two surfaces of the dielectric polymer substrate by chemical vapor deposition polymerization and/or irradiation polymerization,
    wherein the dielectric polymer substrate has a first thickness between the two surfaces and the coating layer has a second thickness less than 50% of the first thickness of the dielectric polymer substrate, and
    wherein the coating layer comprises any one selected from parylenes, polynitriles, poly(meth)acrylates, polyvinyl ethers, polyvinylidenes that are one selected from polyvinylidene chloride, polyvinylidene cyanide, and copolymers or mixtures thereof.

2. The dielectric film according to claim 1, wherein the second thickness of the coating layer is less than 30% of the first thickness of the dielectric polymer substrate.

3. The dielectric film according to claim 1, wherein the coating layer is any one selected from polyvinylidenes or mixtures thereof.

4. The dielectric film according to claim 1, wherein the parylene is any one selected from Parylene F, Parylene N, Parylene C, Parylene D, Parylene HT, reactive parylenes, and copolymers or mixtures thereof.

5. The dielectric film according to claim 1, wherein the polynitrile is any one selected from acrylonitrile homopolymers and copolymers.

6. The dielectric film according to claim 1, wherein the copolymer is a crosslinking copolymer.

7. The dielectric film according to claim 6, wherein the crosslinking copolymer is derived from a mixture of (meth)acrylate(s), vinyl ether(s), and initiator(s).

8. The dielectric film according to claim 1, wherein the irradiation polymerization is conducted by any one selected from UV irradiation, electron beam irradiation, gamma irradiation, X-ray irradiation, microwave irradiation and combinations thereof.

9. The dielectric film according to claim 1, wherein the dielectric polymer substrate comprises any one selected from polypropylene (PP), crosslinked polypropylene (PPX), polyethylene (PE), crosslinked polyethylene (PEX), polyethylene terephthalate (PET), polycarbonate (PC), polyethylene naphthalate (PEN), polyphenylene sulfide (PPS), polytetrafluoroethylene (PTFE), polyvinylidene difluoride (PVDF), polyamide (PA), polyimide (PI), polyetherimide (PEI), polyvinyl chloride (PVC), polystyrene (PS), cyanoresins, and copolymers or mixtures thereof.

10. The dielectric film according to claim 1, wherein the dielectric film further comprises a primer layer between the dielectric polymer substrate and the coating layer.

11. The dielectric film according to claim 10, wherein the primer layer comprises a silane.

12. A power capacitor comprising a dielectric film according to claim 1.

13. A process for preparing a dielectric film, the process comprising:
    providing a dielectric polymer substrate having two surfaces opposite to each other and a first thickness constituted between the two surfaces; and
    forming a coating layer on at least one of the two surfaces of the dielectric polymer substrate by chemical vapor deposition polymerization and/or irradiation polymerization, wherein the coating layer has a second thickness which is less than 50% of the first thickness of the dielectric polymer substrate, and
    wherein the coating layer comprises any one selected from parylenes, polynitriles, poly(meth)acrylates, polyvinyl ethers, and polyvinylidenes that are one selected from polyvinylidene chloride, polyvinylidene cyanide and copolymers or mixtures thereof.

14. The process according to claim 13, wherein the process further comprises forming a primer layer on the at least one of the two surfaces of the dielectric polymer substrate before forming the coating layer.

15. The dielectric film according to claim 1, wherein the irradiation polymerization is conducted by any one selected from gamma irradiation, X-ray irradiation, microwave irradiation and combinations thereof.

* * * * *